(12) United States Patent
Shirahata

(10) Patent No.: US 8,318,258 B2
(45) Date of Patent: Nov. 27, 2012

(54) SILSESQUIOXANE RESINS

(75) Inventor: Akihiko Shirahata, Chiba (JP)

(73) Assignee: Dow Corning Toray Co., Ltd., Tokyo (JP)

( * ) Notice: Subject to any disclaimer, the term of this patent is extended or adjusted under 35 U.S.C. 154(b) by 355 days.

(21) Appl. No.: 12/811,130

(22) PCT Filed: Dec. 5, 2008

(86) PCT No.: PCT/US2008/085643
§ 371 (c)(1),
(2), (4) Date: Jun. 29, 2010

(87) PCT Pub. No.: WO2009/088600
PCT Pub. Date: Jul. 16, 2009

(65) Prior Publication Data
US 2012/0027917 A1   Feb. 2, 2012

Related U.S. Application Data

(60) Provisional application No. 61/019,714, filed on Jan. 8, 2008.

(51) Int. Cl.
*B05D 3/02* (2006.01)
*G03F 7/075* (2006.01)
*C08G 77/00* (2006.01)

(52) U.S. Cl. ............ 427/387; 430/270.1; 430/313; 430/325; 528/22; 528/31; 528/43; 524/317; 524/588; 524/837

(58) Field of Classification Search .......... 427/58, 427/387; 430/270.1, 313, 325; 528/22, 31, 528/43; 524/317, 588, 837
See application file for complete search history.

(56) References Cited

U.S. PATENT DOCUMENTS

| | | | |
|---|---|---|---|
| 4,587,138 A | 5/1986 | Yau et al. |
| 5,010,159 A | 4/1991 | Bank et al. |
| 5,100,503 A | 3/1992 | Allman et al. |
| 5,210,168 A | 5/1993 | Bergstrom et al. |
| 5,412,053 A | 5/1995 | Lichtenhan et al. |
| 5,422,223 A | 6/1995 | Sachdev et al. |
| 5,441,765 A | 8/1995 | Ballance et al. |
| 5,484,867 A | 1/1996 | Lichtenhan et al. |
| 5,589,562 A | 12/1996 | Lichtenhan et al. |
| 5,691,396 A | 11/1997 | Takemura et al. |
| 5,708,099 A | 1/1998 | Kushibiki et al. |
| 5,762,697 A | 6/1998 | Sakamoto et al. |
| 5,891,529 A | 4/1999 | Harkness et al. |
| 6,057,239 A | 5/2000 | Wang et al. |
| 6,087,064 A | 7/2000 | Lin et al. |
| 6,143,855 A | 11/2000 | Hacker et al. |
| 6,156,640 A | 12/2000 | Tsai et al. |
| 6,177,143 B1 | 1/2001 | Treadwell et al. |
| 6,268,457 B1 | 7/2001 | Kennedy et al. |
| 6,281,285 B1 | 8/2001 | Becker et al. |
| 6,329,118 B1 | 12/2001 | Hussein et al. |
| 6,340,734 B1 | 1/2002 | Lin et al. |
| 6,344,284 B1 | 2/2002 | Chou |
| 6,359,096 B1 | 3/2002 | Zhong et al. |
| 6,365,765 B1 | 4/2002 | Baldwin et al. |
| 6,368,400 B1 | 4/2002 | Baldwin et al. |
| 6,395,397 B2 | 5/2002 | Hong et al. |
| 6,420,084 B1 | 7/2002 | Angelopoulos et al. |
| 6,420,088 B1 | 7/2002 | Angelopoulos et al. |
| 6,424,039 B2 | 7/2002 | Wang et al. |
| 6,461,955 B1 | 10/2002 | Tsu et al. |
| 6,503,692 B2 | 1/2003 | Angelopoulos et al. |
| 6,506,497 B1 | 1/2003 | Kennedy et al. |
| 6,515,073 B2 | 2/2003 | Sakamoto et al. |
| 6,576,681 B2 | 6/2003 | Zampini et al. |
| 6,589,711 B1 | 7/2003 | Subramanian et al. |
| 6,589,862 B2 | 7/2003 | Wang et al. |
| 6,596,405 B2 | 7/2003 | Zampini et al. |
| 6,599,951 B2 | 7/2003 | Zampini et al. |
| 6,605,362 B2 | 8/2003 | Baldwin et al. |
| 6,730,454 B2 | 5/2004 | Pfeiffer et al. |
| 6,746,530 B2 | 6/2004 | Wang |
| 6,824,879 B2 | 11/2004 | Baldwin et al. |
| 6,924,346 B2 | 8/2005 | Boisvert et al. |
| 6,956,097 B2 | 10/2005 | Kennedy et al. |
| 6,969,753 B2 | 11/2005 | Baldwin et al. |
| 6,982,006 B1 | 1/2006 | Boyers et al. |

(Continued)

FOREIGN PATENT DOCUMENTS

| | | |
|---|---|---|
| EP | 1197511 | 4/2002 |
| EP | 1197998 | 4/2002 |
| JP | 06-56560 | 3/1994 |
| JP | 09221630 | 8/1997 |
| JP | 2002338690 | 11/2002 |
| JP | 2002356617 | 12/2002 |
| WO | WO 00/77575 | 12/2000 |
| WO | WO 02/06402 | 1/2002 |
| WO | WO 03/044077 | 5/2003 |
| WO | WO 03/044078 | 5/2003 |

(Continued)

OTHER PUBLICATIONS

Drylie, Ewan et al., Synthesis and Crystal Structures of Bromo- and Ester- Functionalised Polyhedral Silsesquioxanes, Polyhedron, Mar. 6, 2006, vol. 25, pp. 853-858.

(Continued)

*Primary Examiner* — Brian K Talbot
(74) *Attorney, Agent, or Firm* — Erika Takeuchi

(57) ABSTRACT

Silsesquioxane resins useful in antireflective coatings wherein the silsesquioxane resin has the formula

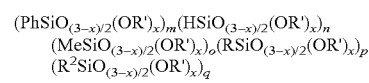

where Ph is a phenyl group, Me is a methyl group; R is selected from a sulfur-containing organic functional group; R' is hydrogen atom or a hydrocarbon group having from 1 to 4 carbon atoms; $R^2$ is selected from ester groups, polyether groups; and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1.

22 Claims, No Drawings

U.S. PATENT DOCUMENTS

| | | | |
|---|---|---|---|
| 7,012,125 B2 | 3/2006 | Kennedy et al. |
| 7,202,013 B2 | 4/2007 | Ogihara et al. |
| 7,294,732 B2 | 11/2007 | Ohno et al. |
| 7,368,173 B2 | 5/2008 | Zhong et al. |
| 7,393,911 B2 | 7/2008 | Noda |
| 2001/0036998 A1 | 11/2001 | Sakamoto et al. |
| 2002/0025495 A1 | 2/2002 | Ogata et al. |
| 2002/0042020 A1 | 4/2002 | Gallagher et al. |
| 2002/0055000 A1 | 5/2002 | Kennedy et al. |
| 2002/0065331 A1 | 5/2002 | Zampini et al. |
| 2002/0095018 A1 | 7/2002 | Baldwin et al. |
| 2002/0128388 A1 | 9/2002 | Kennedy et al. |
| 2002/0187422 A1 | 12/2002 | Angelopoulos et al. |
| 2002/0195419 A1 | 12/2002 | Pavelchek |
| 2002/0198269 A1 | 12/2002 | Zampini et al. |
| 2003/0022953 A1 | 1/2003 | Zampini et al. |
| 2003/0120018 A1 | 6/2003 | Baldwin et al. |
| 2003/0199659 A1 | 10/2003 | Baldwin et al. |
| 2003/0209515 A1 | 11/2003 | Pavelchek |
| 2005/0245717 A1 | 11/2005 | Kennedy et al. |
| 2005/0282090 A1 | 12/2005 | Hirayama et al. |
| 2005/0288468 A1 | 12/2005 | Ohno et al. |
| 2006/0021964 A1 | 2/2006 | Hirayama et al. |
| 2006/0089478 A1 | 4/2006 | Noda |
| 2006/0269724 A1 | 11/2006 | Ohashi et al. |
| 2007/0022909 A1 | 2/2007 | Kennedy et al. |
| 2007/0025678 A1 | 2/2007 | Kushibiki et al. |
| 2007/0298349 A1 | 12/2007 | Zhang et al. |
| 2008/0014335 A1 | 1/2008 | Fu et al. |
| 2008/0318436 A1 | 12/2008 | Fu et al. |

FOREIGN PATENT DOCUMENTS

| | | |
|---|---|---|
| WO | WO 03/044079 | 5/2003 |
| WO | WO 03/044600 | 5/2003 |
| WO | WO 03/089992 | 10/2003 |
| WO | WO 2004/007192 | 1/2004 |
| WO | WO 2004/044025 | 5/2004 |
| WO | WO 2004/046224 | 6/2004 |
| WO | WO 2004/051376 | 6/2004 |
| WO | WO 2004/090965 | 10/2004 |
| WO | WO 2004/113417 | 12/2004 |
| WO | WO 2005/005235 | 1/2005 |
| WO | WO 2005/034236 | 4/2005 |
| WO | WO 2005/034677 | 4/2005 |
| WO | WO 2005/035236 | 4/2005 |
| WO | WO 2006/019468 | 2/2006 |
| WO | WO 2006/065310 | 6/2006 |
| WO | WO 2006/065316 | 6/2006 |
| WO | WO 2006/065320 | 6/2006 |
| WO | WO 2006/065321 | 6/2006 |
| WO | WO 2007/094848 | 8/2007 |
| WO | WO 2007/094849 | 8/2007 |
| WO | WO 2009/091440 | 7/2009 |
| WO | WO 2009/111122 | 9/2009 |
| WO | WO 2010/068336 | 6/2010 |

OTHER PUBLICATIONS

Feher, Frank J. et al. A General Strategy for Synthesizing Cubeoctameric Silsesquioxanes Containing Polymerizable Functional Groups. Main Group Chemistry. May 1998, vol. 2, Issue 3, pp. 169-181, ISSN 1024-1221.

J. Am. Chem. Soc. 1991, 113, 4303 by J. F. Cameron and J.M.J. Frechet.

Kennedy et al., An Anthraacene-Organosiloxane Spin on Antireflective Coating for KrF Lithography, Advances in Resist Technology and Processing XX, Theodore H. Fedynshyn, Editor, Proceedings of SPIE vol. 5039, 2003, 144-151.

Kennedy et al., Organosiloxane based Bottom Antireflective Coatings for 193nm Lithography, Advances in Resist Technology and Processing XX, Theodore H. Fedynyshyn, Editor, Proceedings of SPIE vol. 5039, 2003, 929-939.

Polym. Eng. Sci 1992, 32, 1462 by J. V. Crivello.

Rahimian, Kamyar et al., Soluble, High Molecular Weight Polysilsesquioxanes with Carboxylate Functionalities, Macromolecules, Mar. 26, 2002, vol. 35, pp. 2452-2454.

Schiavone et al., SiON based antireflective coating for 193nm lithography, Part of the SPIE Conference on Advances in Resist Technology and Processing XVI, SPIE vol. 3678, Mar. 1999, 391-395.

J. Polym Sci 1999, 37, 4241 by J.V. Crivello.

Xu, Hui et al., Synthesis and Characterization of Oligomeric Silsesquioxane with Pendent Carboxylic Acid Groups, European Polymer Journal, Dec. 2001, vol. 37, pp. 2397-2405.

Tsunooka et al., J. Photopolym. Sci. Technol., vol. 19, No. 1, 2006, pp. 65-71.

Ito et al., Can. J. Chem. 73: 1924-1932 (1995).

King Industries Specialty Chemicals, K-Pure® High Performance Additives for Electronic Chemical Systems.

SILSESQUIOXANE RESINS

CROSS REFERENCE TO RELATED APPLICATIONS

This application is a U.S. national stage filing under 35 U.S.C. §371 of PCT Application No. PCT/US08/85643 filed on 5 Dec. 2008, currently pending, which claims the benefit of U.S. Provisional Patent Application No. 61/019,714 filed 8 Jan. 2008 under 35 U.S.C. §119 (e). PCT Application No. PCT/US08/85643 and U.S. Provisional Patent Application No. 61/019,714 are hereby incorporated by reference.

BACKGROUND OF THE INVENTION

With the continuing demand for smaller feature sizes in the semiconductor industry, 193 mm optical lithography has emerged very recently as the technology to produce devices with sub-100 nm features. The use of such shorter wavelength of light requires the bottom antireflective coating (BARC) to reduce the reflection on the substrate and dampen the photoresist swing cure by absorbing light that has been passed through the photoresist. Commercially available antireflective coatings (ARC) consist of both organic and inorganic materials. Typically, the inorganic ARC, which exhibit good etch resistant, is CVD based and is subject to the entire integration disadvantage of extreme topography. The organic ARC materials are applied by spin-on process and have excellent fill and planarization properties, but suffer from poor etch selectivity to organic photoresist. As a result, a material that offers the combined advantages of inorganic and organic ARC materials is highly desired.

BRIEF SUMMARY OF THE INVENTION

This invention pertains to silsesquioxane resins useful in antireflective coatings wherein the silsesquioxane resin has the formula

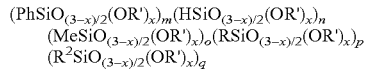

where Ph is a phenyl group, Me is a methyl group; R is selected from a sulfur-containing organic functional group; R' is hydrogen atom or a hydrocarbon group having from 1 to 4 carbon atoms; $R^2$ is selected from ester groups, polyether groups; and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1. When these resins are used in antireflective coatings, the coatings can be stripped at the removal stage. In addition, the presence of a hydrogen atom group in the silsesquioxane resin is essential for the desired cure properties and strip-ability as a 193 nm ARC material.

This invention also pertains to an antireflective coating (ARC) composition comprising
(i) silsesquioxane resin having the formula

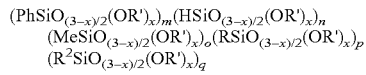

where Ph is a phenyl group; Me is a methyl group; R is selected from a sulfur-containing organic functional group; R' is hydrogen atom or a hydrocarbon group having 1 to 4 carbon atoms; $R^2$ is selected from ester groups, polyether groups, and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1; and
(ii) a solvent.

This invention also pertains to a method of forming an antireflective coating on an electronic device comprising
(A) applying to an electronic device an ARC composition comprising
(i) silsesquioxane resin having the formula

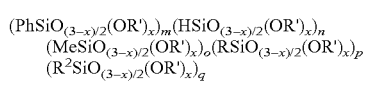

where Ph is a phenyl group; Me is a methyl group; R is selected from a sulfur-containing organic functional group; R' is hydrogen atom or a hydrocarbon group having 1 to 4 carbon atoms; $R^2$ is selected from ester groups, polyether groups, and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1; and
(ii) a solvent, and
(B) removing the solvent and curing the silsesquioxane resin to form an antireflective coating on the electronic device.

DETAILED DESCRIPTION OF THE INVENTION

The silsesquioxane resins useful in forming the antireflective coating have the formula

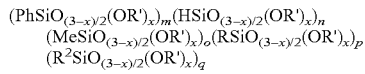

where Ph is a phenyl group; Me is a methyl group; R is selected from a sulfur-containing organic functional group; R' is hydrogen atom or a hydrocarbon group having 1 to 4 carbon atoms; $R^2$ is selected from ester groups, polyether groups, and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1. Typically m has a value of 0.02 to 0.7, alternatively 0.05 to 0.15. Typically n has a value of 0.05 to 0.90, alternatively 0.10 to 0.30. Typically o has a value of 0.05 to 0.90, alternatively 0.25 to 0.75. Typically p has a value of 0.02 to 0.20, alternatively 0.05 to 0.5. Typically q has a value of 0 to 0.25, alternatively 0 to 0.15.

In the resin R is a sulfur-containing functional group. R may be exemplified by, mercaptoalkyl groups having the general formula $HS(CH_2)_z-$ where z has a value of 1 to 18, sulfide or polysulfido compounds having the general formulas $R^3S(CH_2)z-$, $R^3SS(CH_2)_z-$, and $R^3SSS(CH_2)_z-$ where $R^3$ is a H atom, an C1-C4 alkyl group such as methyl, ethyl or propyl or a aryl group such as phenyl. R may be further exemplified by mercaptopropyl, mercaptoethyl, and mercaptomethyl.

R' is independently a hydrogen atom or hydrocarbon group having 1 to 4 carbon atoms. R' may be exemplified by H, methyl, ethyl, propyl, iso-propyl and butyl.

$R^2$ is selected from ester groups, polyether groups, and polyethylene oxide groups. Ester groups may be any organic substituent containing at least one ester functionality. Polyether groups are an organic substituent having hydrocarbon units linked through oxygen atom, represented, but not limited, by the following structure: $-(CH_2)_a[O(CH_2)_b]_cOR'$, wherein a=2 to 12; b=2 to 6; c=2 to 200; R'=H, alkyl, or other organic groups. Polyethylene oxide groups are groups having at least one repeating unit of —(CH$_2$CH$_2$O)t- where t is a number selected from 0 to 50. Examples of ester groups useful herein are —(CH$_2$)$_2$—O—C(O)Me and —(CH$_2$)$_2$—C(O)—OMe. Examples of polyether groups useful herein are —(CH$_2$)$_3$—(OCH$_2$CH$_2$)$_7$—OMe, —(CH$_2$)$_3$—(OCH$_2$CH$_2$)$_7$—OH and —(CH$_2$)$_3$—(OCH$_2$CH$_2$)$_7$—OAc. Examples of polyethylene oxides useful herein are —(CH$_2$)$_3$—(OCH$_7$CH$_2$)$_t$—OMe, —(CH$_2$)$_3$—(OCH$_2$CH$_2$)$_t$—OC(O)Me, and —(CH$_2$)$_3$—(OCH$_2$CH$_2$)$_t$—OH.

The typical method for producing the silsesquioxane resin involves the hydrolysis and condensation of the appropriate silanes. By this method it is possible that residual —OH and/or —OR' will remain in the silsesquioxane resin as a result of incomplete hydrolysis or condensation. If the total amount of units in the silsesquioxane resin containing —OR' groups, exceed 40 mole % then gellation and instability of the resin may occur. Typically the silsesquioxane resin contains less 5 mole % or units containing —OR' groups, alternatively less than 1 mole %.

The silsesquioxane resin has a weight average molecular weight (Mw) in the range of 500 to 50,000 alternatively in the range of 2500 to 25,000, alternatively in the range of 4,000 to 20,0000 as determined by gel permeation chromatography employing RI detection and polystyrene standards.

The silsesquioxane resins may be produced by methods known in the art. For example, they may be produced by the hydrolysis and condensation of a trichlorosilanes using the methods as set forth in U.S. Pat. No. 6,281,285 to Becker et al. and U.S. Pat. No. 5,010,159 to Bank et al. Alternatively, the silsesquioxane resins may be produced by the hydrolysis and condensations of alkoxysilanes.

The silsesquioxane resin is typically produced in the presence of a solvent. Any suitable organic or silicone solvent that does not contain a functional group which may participate in the hydrolysis and/or condensation reaction may be used in producing the silsesquioxane resin. The solvent is generally used in an amount of 40 to 98 weight percent based on the total weight of solvent and silane reactants, alternatively 70 to 90 weight percent. The reaction may be carried out as a dual phase or single-phase system.

Useful organic solvents may be exemplified by, but not limited to, saturated aliphatics such as n-pentane, hexane, n-heptane, and isooctane; cycloaliphatics such as cyclopentane and cyclohexane; aromatics such as benzene, toluene, xylene, mesitylene; ethers such as tetrahydrofuran, dioxane, ethylene glycol dietheyl ether, ethylene glycol dimethyl ether; ketones such as methylisobutyl ketone (MIBK) and cyclohexanone; halogen substituted alkanes such as trichloroethane; halogenated aromatics such as bromobenzene and chlorobenzene; esters such as propylene glycol monomethyl ether acetate (PGMEA), isobutyl isobutyrate and propyl propronate. Useful silicone solvents may be exemplified by, but not limited to cyclic siloxanes such as octamethylcyclotetrasiloxane, and decamethylcyclopentasiloxane. A single solvent may be used or a mixture of solvents may be used.

The reaction to produce the silsesquioxane resin can be carried out at any temperature so long as it does not cause significant gellation or cause curing of the silsesquioxane resin. Typically the reaction is carried out at a temperature in the range of 5° C. to 150° C., with 50° C. to 100° C. suggested.

The time to form the silsesquioxane resin is dependent upon a number of factors such as the temperature, the type and amount of silane reactants, and the amount of catalyst, if present. Typically the reaction time is from several minutes to several hours. One skilled in the art will be able to readily determine the time necessary to complete the reaction. Catalysts that may be used to facilitate the reaction include, but are not limited to, nitric acid, sulfuric acid, hydrochloric acid, and others.

Following completion of the reaction the catalyst may be optionally removed. Methods for removing the catalyst are well know in the art and would include neutralization, stripping or water washing or combinations thereof. The catalyst may negatively impact the shelf life of the silicone resin especially when in solution thus its removal is suggested.

In the process for making the silsesquioxane resin, after the reaction is complete, volatiles may be removed from the silsesquioxane resin solution under reduced pressure. Such volatiles include alcohol by-products, excess water, catalyst, hydrochloric acid (chlorosilane routes) and solvents. Methods for removing volatiles are known in the art and include, for example, distillation.

Following the reaction to produce the silsesquioxane resin a number of optional steps may be carried out to obtain the silsesquioxane resin in the desired form. For example, the silsesquioxane resin may be recovered in solid form by removing the solvent. The method of solvent removal is not critical and numerous methods are well known in the art (e.g. distillation under heat and/or vacuum). Once the silsesquioxane resin is recovered in a solid form, the resin can be optionally re-dissolved in the same or another solvent for a particular use. Alternatively, if a different solvent, other than the solvent used in the reaction, is desired for the final product, a solvent exchange may be done by adding a secondary solvent and removing the first solvent through distillation, for example. Additionally, the resin concentration in solvent can be adjusted by removing some of the solvent or adding additional amounts of solvent.

This invention also pertains to an antireflective coating (ARC) composition comprising (i) silsesquioxane resin having the formula

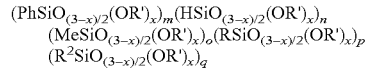

where Ph is a phenyl group; Me is a methyl group; R is selected from a sulfur-containing organic functional group; R' is hydrogen atom or a hydrocarbon group having 1 to 4 carbon atoms; R$^2$ is selected from ester groups, polyether groups, and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1; and (ii) a solvent.

Useful solvents (ii) include, but are not limited to, 1-methoxy-2-propanol, propylene glycol monomethyl ethyl acetate and cyclohexanone, among others. The ARC composition typically comprises from about 10% to about 99.9 wt % solvent based on the total weight of the ARC composition, alternatively 80 to 95 wt %.

The ARC composition may comprise a free radical initiator or other additives. Suitable free radical initiators include peroxides and photoinitiators such as benzoyl peroxide, dicumyl peroxide, azobisisobutyronitrile (AIBN) and others. Typically the free radical initiator is present in an amount of up to 1000 ppm, alternatively 10 to 500 ppm, based on the total weight of the ARC composition. The other additives may include, but not limited to, photo-acid and thermal-acid generators, photo-base and thermal-base generators.

The antireflective coating compositions are formed by mixing together the silsesquioxane resin, solvent, and optionally the free radical initiator or other additive. Typically the free radical initiator or other additive is added to the coating composition just prior to its use to prevent premature curing.

The antireflective coating composition is applied to an electronic device to produce a coated substrate. The solvent is removed and the silsesquioxane resin is cured to produce the antireflective coating on the electronic device.

Typically the electronic device is a semiconductor device, such as silicon-based devices and gallium arsenide-based devices intended for use in the manufacture of a semiconductor component. Typically, the device comprises at least one semiconductive layer and a plurality of other layers comprising various conductive, semiconductive, or insulating materials.

Specific methods for application of the ARC composition to the electronic device include, but are not limited to, spin-coating, dip-coating, spay-coating, flow-coating, screen-printing and others. The preferred method for application is spin coating. Typically, coating involves spinning the electronic device, at about 2000 RPM, and adding the ARC composition to the surface of the spinning electronic device.

The solvent is removed and the silsesquioxane resin is cured to form the anti-reflective coating on the electronic device. Curing generally comprises heating the coating to a sufficient temperature for a sufficient duration to lead to curing. Curing occurs when sufficient crosslinking has taken place such that the silsesquioxane resin is essentially insoluble in the solvent from which it was applied. Curing may take place for example by heating the coated electronic device at 80° C. to 450° C. for 0.1 to 60 minutes, alternatively 150° C. to 275° C. for of 0.5 to 5 minutes, alternatively 200° C. to 250° C. for 0.5 to 2 minutes. Any method of heating may be used during the curing step. For example, the coated electronic device may be placed in a quartz tube furnace, convection oven or allowed to stand on hot plates. Alternatively, the anti-reflective coating can be cured under ultraviolet irradiation in the presence of photoactive additives, such as photoacid generator (PAG) or photobase generators.

To protect the silsesquioxane resin of the coated composition from reactions with oxygen or carbon during curing, the curing step can be performed under an inert atmosphere. Inert atmospheres useful herein include, but are not limited to nitrogen and argon. By "inert" it is meant that the environment contain less than 50 ppm and preferably less than 10 ppm of oxygen. The pressure at which the curing and removal steps are carried out is not critical. The curing step is typically carried out at atmospheric pressure although sub or super atmospheric pressures may work also.

Once cured, the electronic device comprising the anti-reflective coating can be used in further substrate processing steps, such as photolithography. When used in photolithography, a resist image is formed over the anti-reflective coating. The process for forming the resist image comprises (a) forming a film of a resist composition on top of the anti-reflective coating; (b) imagewise exposing the resist film to radiation to produce an exposed film; and (c) developing the exposed film to produce an image. The anti-reflective coatings on the electronic device are particularly useful with resist compositions that are imagewise exposed to ultraviolet radiation having a wavelength of 157 nm to 365 nm, alternatively ultraviolet radiation having a wavelength of 157 nm or 193 nm. Once an image has been produced in the resist film, then a pattern is etched in the anti-reflective coating. Known etching materials may be used to remove the anti-reflective coating. Additional steps or removing the resist film and remaining anti-reflective coating may be employed to produce a device having the desired architecture.

The ARC coating compositions can be cured at lower temperatures and they produce coatings that can be removed by stripping solutions. It has been found that the antireflective coatings produced herein have better solvent (e.g. PGMEA) and TMAH resistance.

The following examples are included to demonstrate embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %.

Examples 1-12

The amounts of reactants used is given in Tables 1. A mixture of PGMEA, phenyltrichlorosilane (Silane 1), trichlorosilane (Silane 2), methyltrichlorosilane (Silane 3), and 2-(carbomethoxy)ethyltrichlorosilane (Silane 4) and mercaptopropyltrimethoxysilane (Silane 5) were added to a reactor under nitrogen. A solution of PGMEA and of water was added to the solution of trichlorosilanes over a 90 minute period. The reaction was allowed to body, stirring at 20° C. for another hour. The resulting reaction product was water or water/ethyl acetate washed and separated. Ethanol was then added to the resin solution and the solution was stripped to approximately 22 wt %. Cold n-hexane was then added to the solution and the bottom layer was collected. Additional PGMEA was added and the solution was stripped to <10 wt % solids in PGMEA. The solution was diluted to 10 wt % with additional PGMEA. The solution was filtered through a 0.20 micron PTFE filter. A resin with the general formula T(H)T(Me)T(Ph)T($R^2$)T(R) was produced. Results are given in Table 2. Run 4/5 was carried out as one run and the product was fractionated to obtain two resins with different Mw.

TABLE 1

Amount of reactants (grams).

| Run | PGMEA | PhSiCl$_3$ | HSiCl$_3$ | MeSiCl$_3$ | Silane 4 | Silane 5 | Water |
|---|---|---|---|---|---|---|---|
| 1 | 1400 | 17.5 | 29.8 | 106.9 | 0.0 | 16.2 | 44.0 |
| 2 | 1463 | 17.5 | 29.8 | 98.7 | 0.0 | 27.0 | 44.0 |
| 3 | 1527 | 17.5 | 29.8 | 90.4 | 0.0 | 37.8 | 44.0 |
| 4/5 | 1545 | 17.5 | 29.8 | 90.4 | 18.3 | 21.6 | 44.0 |
| 6 | 1545 | 17.5 | 29.8 | 90.4 | 18.3 | 21.6 | 44.0 |
| 7 | 1672 | 17.5 | 29.8 | 74.0 | 18.3 | 43.2 | 44.0 |
| 8 | 1800 | 17.5 | 29.8 | 57.5 | 18.3 | 64.8 | 44.0 |

TABLE 1-continued

Amount of reactants (grams).

| Run | PGMEA | PhSiCl$_3$ | HSiCl$_3$ | MeSiCl$_3$ | Silane 4 | Silane 5 | Water |
|---|---|---|---|---|---|---|---|
| 9  | 1250 | 17.5 | 29.8 | 90.4  | 18.3 | 21.6 | 44.0 |
| 10 | 1402 | 23.8 | 40.6 | 123.3 | 0.0  | 51.5 | 60.0 |
| 11 | 1463 | 23.8 | 40.6 | 112.1 | 0.0  | 66.3 | 60.0 |
| 12 | 1402 | 23.8 | 40.6 | 123.3 | 0.0  | 51.5 | 60.0 |

TABLE 2

| Run | T(H) | T(Me) | T(Ph) | T(R$^2$) | T(R) | Mn | Mw | n @ 193 | k @ 193 | Solvent Loss PGMEA* | Solvent Loss TMAH* | Water Angle | Surface Energy |
|---|---|---|---|---|---|---|---|---|---|---|---|---|---|
| 1  | 20% | 65% | 7.5% | 0    | 7.5%  | 4780 | 11800 | 1.678 | 0.155 | 175 | 21  | 89.33 | 27.4 |
| 2  | 20% | 60% | 7.5% | 0    | 12.5% | 3750 | 8690  | 1.69  | 0.169 | 373 | 34  | 88.67 | 26.2 |
| 3  | 20% | 55% | 7.5% | 0    | 17.5% | 3270 | 7260  | 1.704 | 0.176 | 454 | 46  | 88.67 | 28.1 |
| 4  | 20% | 55% | 7.5% | 7.5% | 10%   | 3700 | 8160  | 1.68  | 0.153 | 11  | 28  |       |      |
| 5  | 20% | 55% | 7.5% | 7.5% | 10%   | 2290 | 4130  | 1.687 | 0.166 | 58  | 17  | 85.00 | 30.1 |
| 6  | 20% | 55% | 7.5% | 7.5% | 10%   | 3350 | 7520  | 1.681 | 0.155 | 34  | 31  | 84.17 | 30.4 |
| 7  | 20% | 45% | 7.5% | 7.5% | 20%   | 2310 | 4720  | 1.701 | 0.164 | 64  | 69  | 83.00 | 31.0 |
| 8  | 20% | 35% | 7.5% | 7.5% | 30%   | 1970 | 3660  | 1.723 | 0.168 | 109 | 160 | 81.83 | 31.5 |
| 9  | 20% | 55% | 7.5% | 7.5% | 10%   | 4820 | 11500 | 1.680 | 0.153 | 20  | 33  | 88.67 | 30.1 |
| 10 | 20% | 55% | 7.5% | 0    | 17.5% | 6460 | 16100 | 1.689 | 0.164 | 109 | 24  | 88.17 | 27.1 |
| 11 | 20% | 50% | 7.5% | 0    | 22.5% | 4680 | 10700 | 1.712 | 0.171 | 466 | 64  | 90.33 | 26.0 |
| 12 | 20% | 55% | 7.5% | 0    | 17.5% | 6080 | 15200 | 1.724 | 0.192 | 284 | 29  | 90.00 | 26.1 |

*Loss (Å) after 250° C., 1 minute bake
R$^2$ = —CH$_2$CH$_2$C(O)OMe
R = —CH$_2$CH$_2$CH$_2$SH That which I claimed is:

1. A silsesquioxane resins having the formula

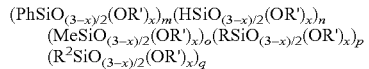
$(R^2SiO_{(3-x)/2}(OR')_x)_q$ where Ph is a phenyl group, Me is a methyl group; R is a mercaptoalkyl group of the formula HS(CH$_2$)$_z$— where z has a value of 1 to 18; R' is hydrogen atom or a hydrocarbon group having from 1 to 4 carbon atoms; R$^2$ is selected from ester groups, polyether groups; and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1.

2. The silsesquioxane resin as claimed in claim 1 wherein m has a value of 0.02 to 0.7, n has a value of 0.05 to 0.90, o has a value of 0.05 to 0.90, p has a value of 0.02 to 0.20, and q has a value of 0 to 0.25.

3. The silsesquioxane resin as claimed in claim 1 where R is a mercaptopropyl group.

4. The silsesquioxane resin as claimed in claim 1 wherein R$^2$ is selected from ester groups, polyether groups, and polyethylene oxide groups.

5. The silsesquioxane resin as claimed in claim 1 wherein R$^2$ is —(CH$_2$)$_2$—C(O)—OMe.

6. The silsesquioxane resin as claimed in claim 1 wherein the resin has a molecular weight in the range of 500 to 50,000.

7. An antireflective coating composition comprising
(i) silsesquioxane resin having the formula

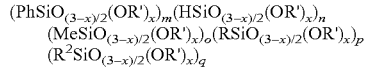
$(R^2SiO_{(3-x)/2}(OR')_x)_q$ where Ph is a phenyl group; Me is a methyl group; R is a mercaptoalkyl group of the formula HS(CH$_2$)$_z$— where z has a value of 1 to 18; R' is hydrogen atom or a hydrocarbon group having 1 to 4 carbon atoms; R$^2$ is selected from ester groups, polyether groups, and polyethylene oxide groups; x has a value of 0, 1 or 2; m has a value of 0.01 to 0.97; n has a value of 0.01 to 0.97; o has a value of 0.01 to 0.97; p has a value of 0.01 to 0.97; q has a value of 0 to 0.96; and m+n+o+p+q≈1; and
(ii) a solvent.

8. The antireflective coating composition as claimed in claim 7 wherein m has a value of 0.02 to 0.7, n has a value of 0.05 to 0.90, o has a value of 0.05 to 0.90, p has a value of 0.02 to 0.20, and q has a value of 0 to 0.25.

9. The antireflective coating composition as claimed in claim 7 where R is a mercaptopropyl group.

10. The antireflective coating composition as claimed in claim 7 wherein R$^2$ is selected from ester groups, polyether groups, and polyethylene oxide groups.

11. The antireflective coating composition as claimed in claim 7 wherein R$^2$ is —(CH$_2$)$_2$—C(O)—OMe.

12. The antireflective coating composition as claimed in claim 7 wherein the resin has a molecular weight in the range of 500 to 50,000.

13. The antireflective coating composition as claimed in claim 7 wherein the solvent is selected from 1-methoxy-2-propanol, propylene glycol monomethyl ethyl acetate and cyclohexanone.

14. The antireflective coating composition as claimed in claim 7 wherein the composition additionally comprises a free radical initiator.

15. A method of forming an antireflective coating on an electronic device comprising
(A) applying to an electronic device an ARC composition comprising
(i) silsesquioxane resin having the formula

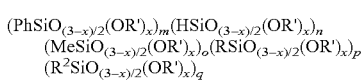
$(R^2SiO_{(3-x)/2}(OR')_x)_q$ where Ph is a phenyl group; Me is a methyl group; R is a mercaptoalkyl group of the formula HS(CH$_2$)$_z$— where z has a value of 1 to 18; R' is hydrogen atom or a hydrocarbon group having 1 to 4 carbon atoms; R$^2$ is selected from ester groups, polyether groups, and polyethylene oxide groups; x has a value of 0, 1 or 2; m has a value of 0.01 to 0.97; o has a value of 0.01 to 0.97; p has a value of 0.01 to 0.97; q has a value of 0 to 0.96; and m+n+o+p+q≈1; and (ii) a solvent, and (B) removing the solvent and curing the silsesquioxane resin to form an antireflective coating on the electronic device.

16. The method as claimed in claim 15 where R is a mercaptopropyl group.

17. The method as claimed in claim 15 wherein $R^2$ is —$(CH_2)_2$—C(O)—OMe.

18. The method as claimed in claim 15 wherein the solvent is selected from 1-methoxy-2-propanol, propylene glycol monomethyl ethyl acetate and cyclohexanone.

19. The method as claimed in claim 15 wherein the composition additionally comprises a free radical initiator.

20. The method as claimed in claim 15 wherein the ARC composition is applied by spin-coating, dip-coating, spay-coating, flow-coating, or screen-printing.

21. The method as claimed in claim 15 wherein the silsesquioxane resin is cured by heating at 80° C. to 450° C. for 0.1 to 60 minutes.

22. The method as claimed in claim 21 wherein the silsesquioxane resin is heated in an inert atmosphere.

* * * * *